April 16, 1929.  J. J. MORRIS  1,709,439
SPINDLE DRIVE TRANSMISSION MECHANISM
Filed Nov. 11, 1926  5 Sheets-Sheet 1
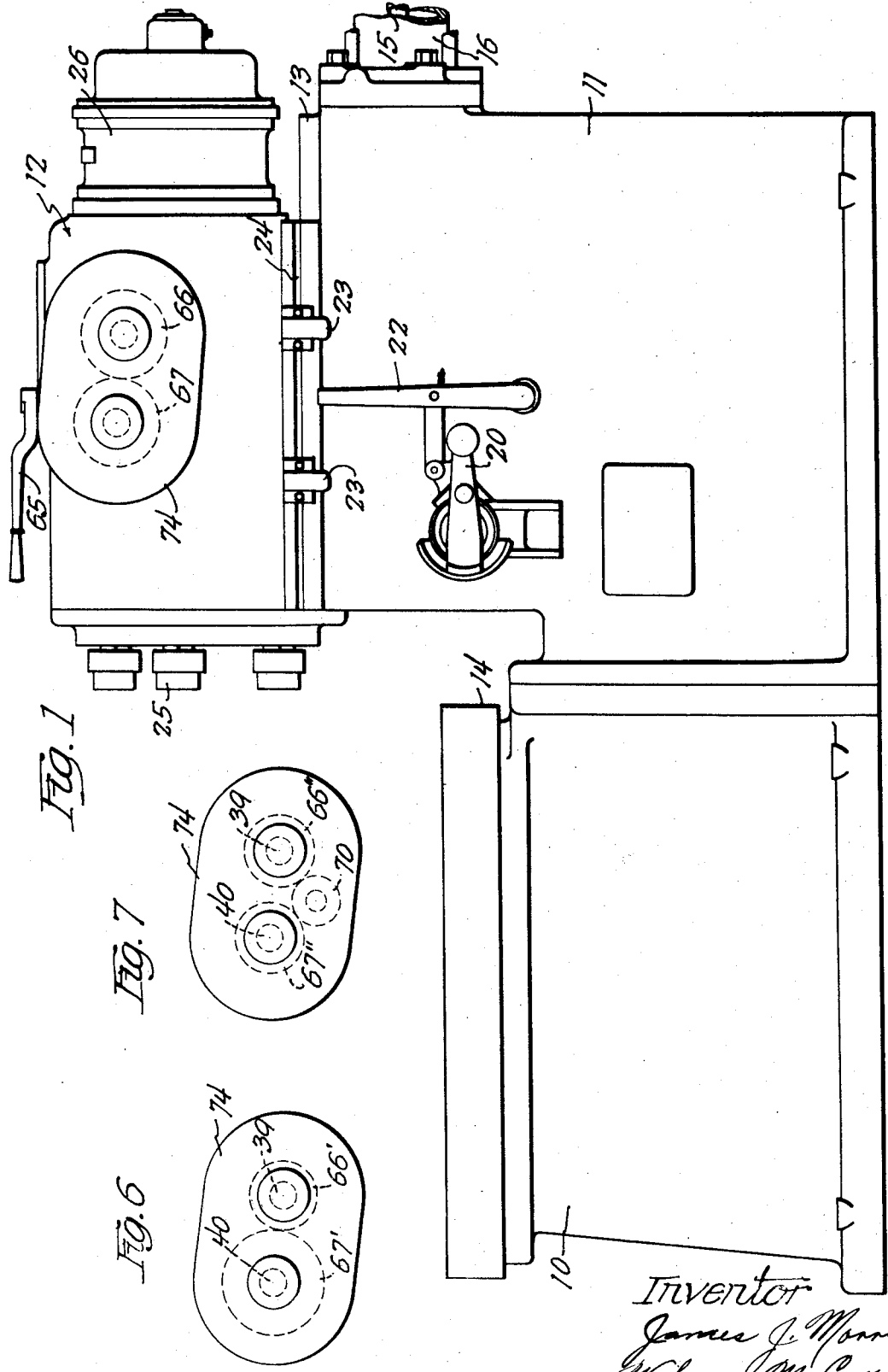

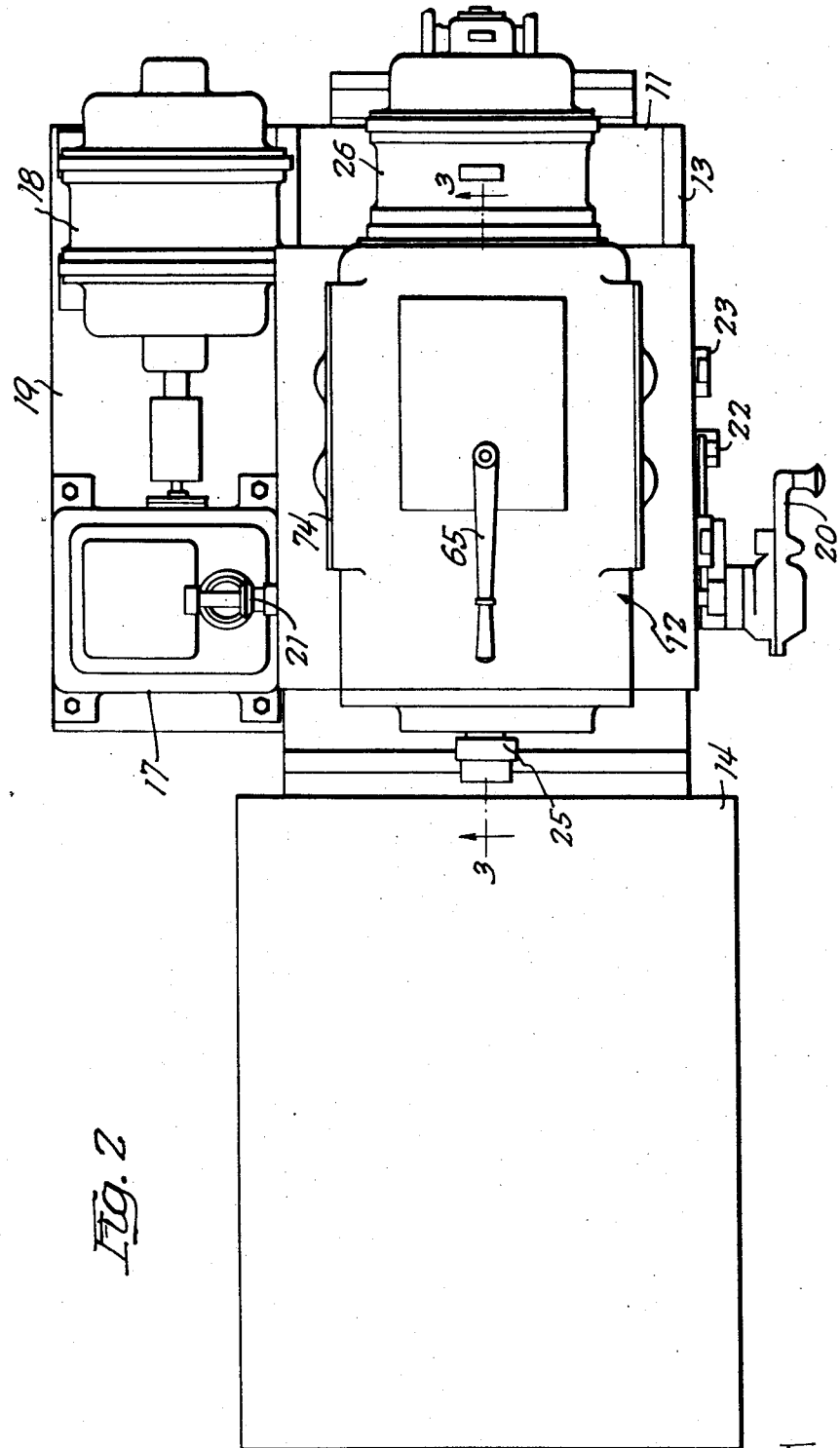

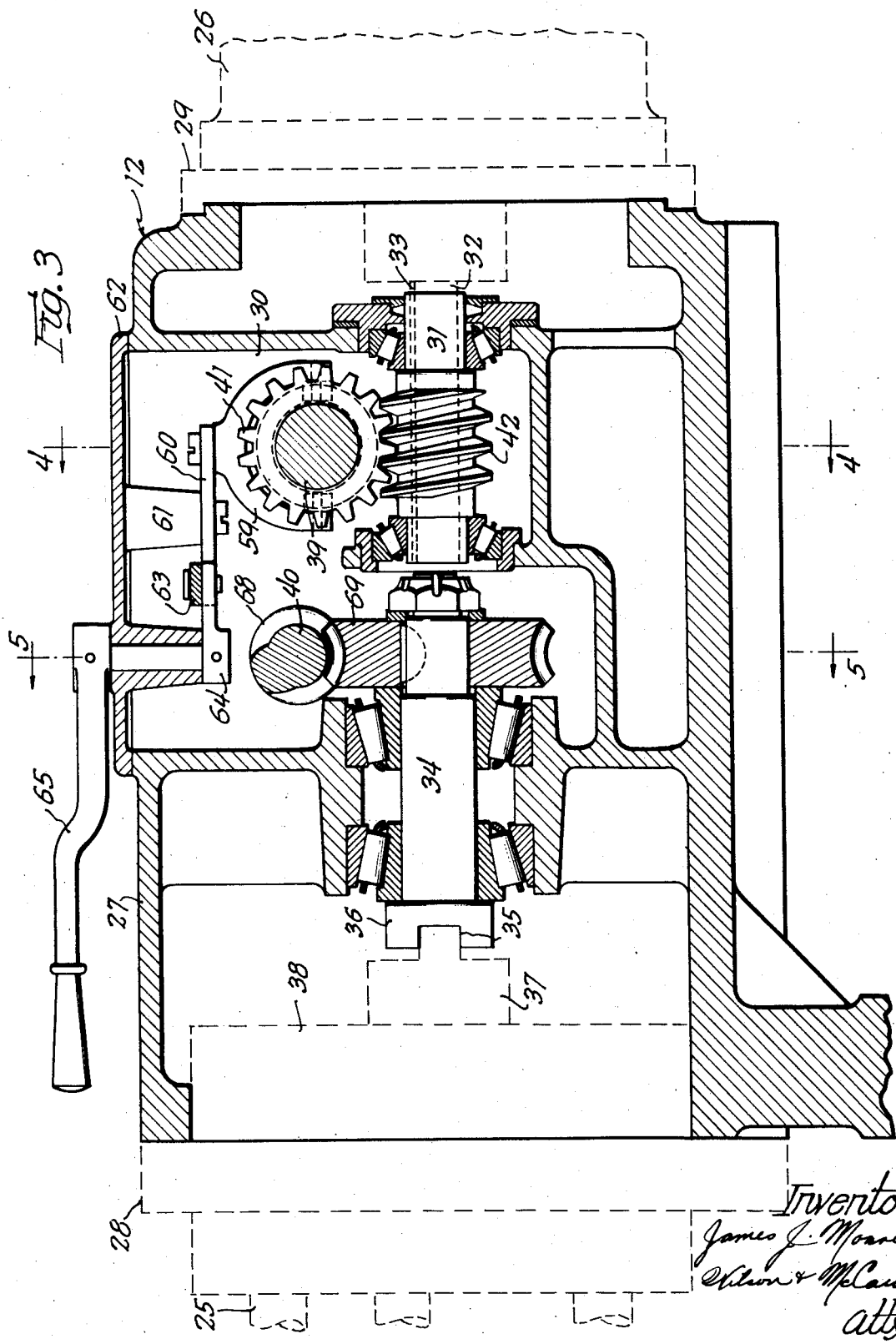

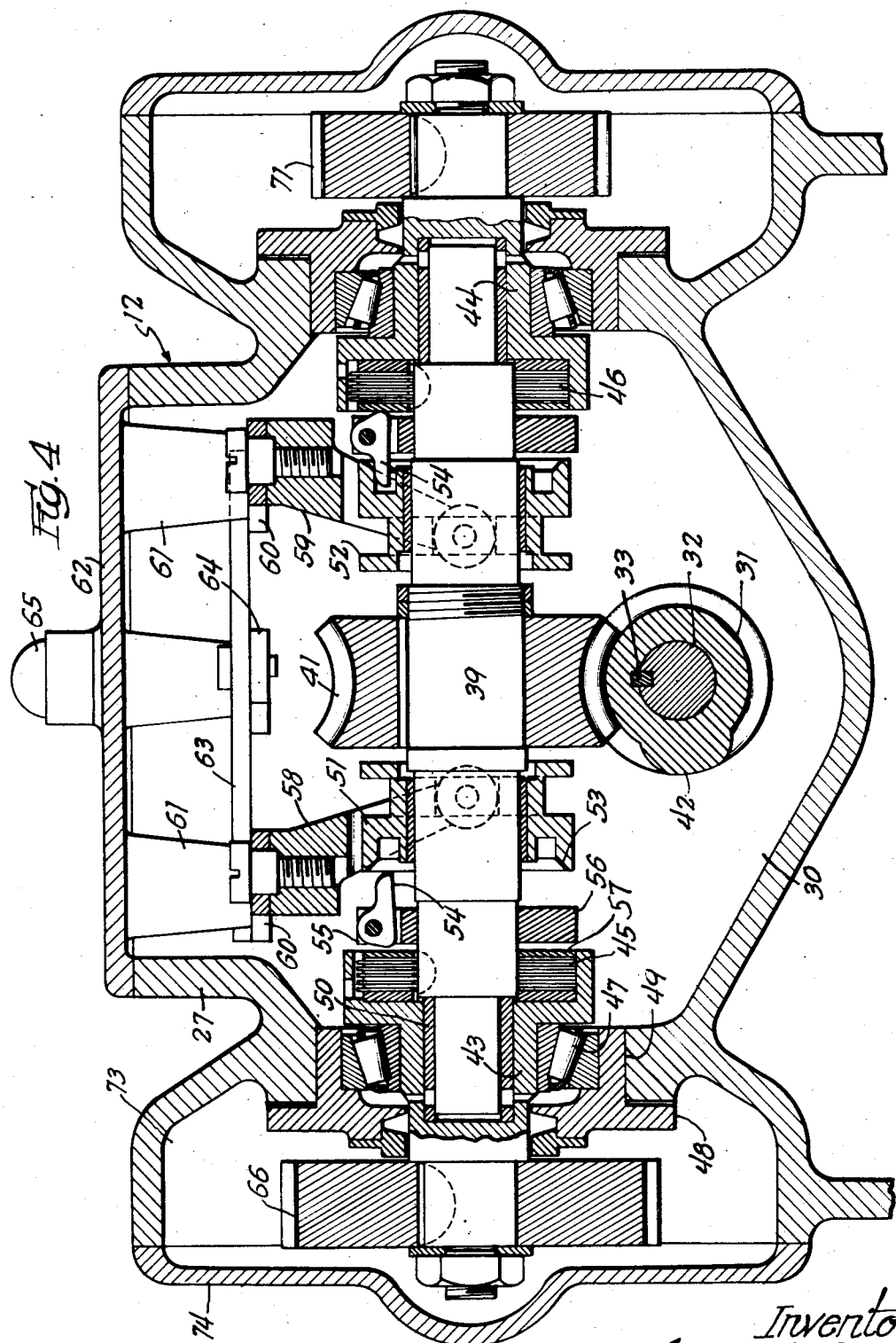

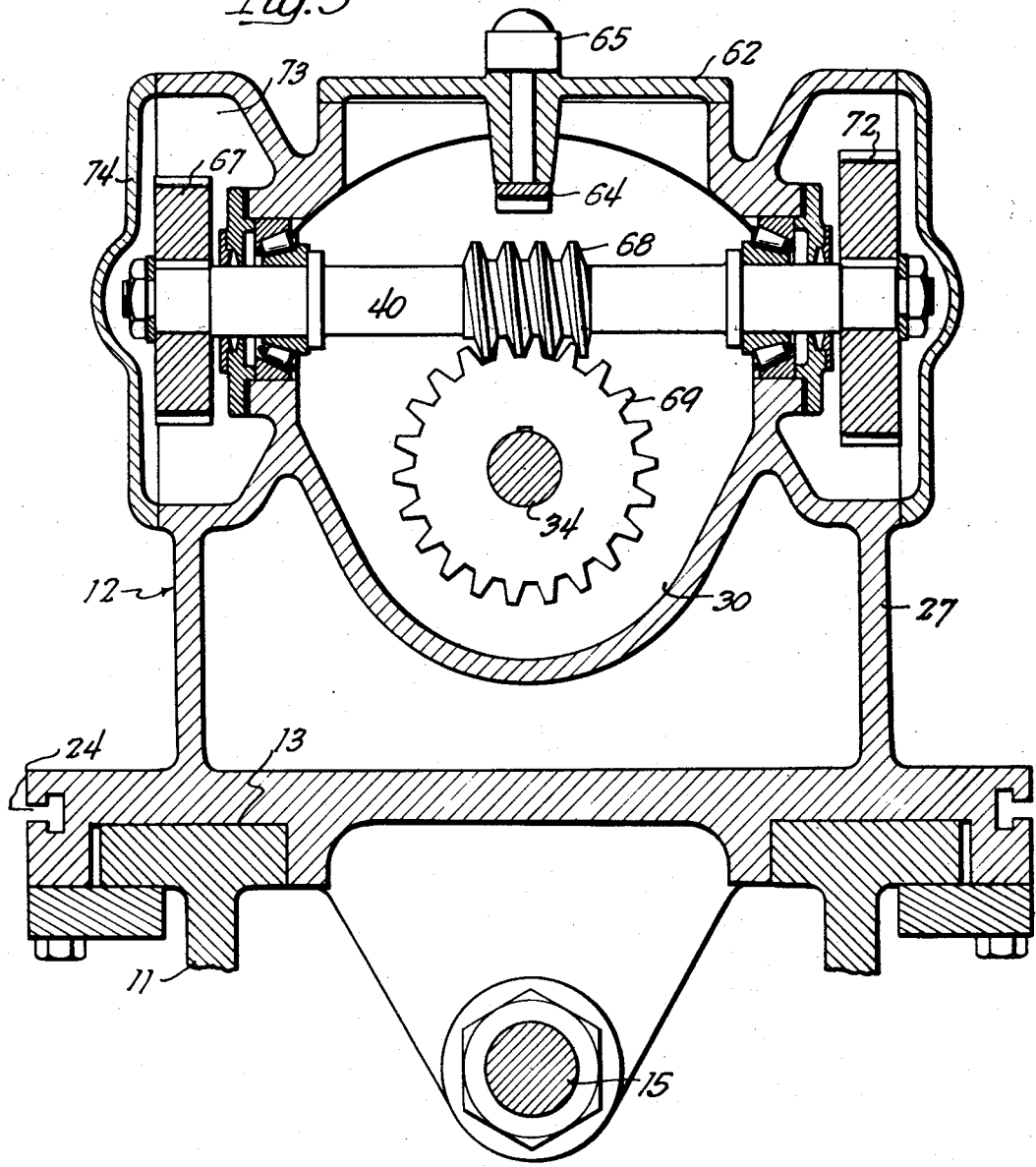

Patented Apr. 16, 1929.

1,709,439

UNITED STATES PATENT OFFICE.

JAMES J. MORRIS, OF ROCKFORD, ILLINOIS, ASSIGNOR TO ROCKFORD DRILLING MACHINE COMPANY, OF ROCKFORD, ILLINOIS, A CORPORATION OF ILLINOIS.

SPINDLE-DRIVE TRANSMISSION MECHANISM.

Application filed November 11, 1926. Serial No. 147,714.

This invention relates to a novel transmission mechanism capable of use with various machine tools, but especially designed and intended for use with a boring and drilling machine to provide the desired range of drives for the spindle or spindles thereof to meet the various requirements of a machine of this kind.

The principal object of the invention is to provide a transmission of an extremely simple and practical form capable of providing either a single speed, two speeds, or one speed forward and the same or a different speed in reverse, the particular speeds selected being secured by the use of pick-off gears removably and interchangeably mounted in the transmission mechanism. A special feature in this connection lies in the provision of two gear sets which may be placed selectively into driving relation with the driven part, such as a spindle, the gear sets being so arranged that the operator by a simple shifting of a hand lever may change from one to the other to produce a step-up or step-down in speed of the spindle, or a reversal in direction thereof.

Another important object of the invention consists in providing a housing serving as a carriage for the spindle or spindles and the driving motor therefor and having the transmission mechanism carried therein to move with the spindles and motor so as to eliminate intermediate gearing, spline shafts, and the like, all of which causes excessive noise and power consumption in the operation thereof and results in increased cost in production and maintenance. A special feature of the self-contained head consists in the provision of removable closure plates on opposite sides thereof affording access to recesses provided in the sides of the housing wherein the pick-off gears are mounted, thus making it a simple matter to make changes in the two gear sets to suit the requirements of any particular job to be handled by the machine.

The invention embraces still other objects and advantages, the details of which will appear in the course of the following specification having reference to the accompanying drawings, wherein—

Figure 1 is a side view of a boring and drilling machine having the head thereof constructed in accordance with my invention and provided with a transmission mechanism embodying the novel features above described;

Fig. 3 is an enlarged central longitudinal vertical section through the head taken on the line 3—3 of Fig. 2;

Fig. 4 is a still further enlarged transverse section taken on the line 4—4 of Fig. 3 looking in the direction of the arrows;

Fig. 5 is a transverse section on the same scale as Fig. 3 taken on the line 5—5 thereof; and Figs. 6 and 7 are similar isolated detail views showing different pick-off gears which may be used on the head to secure respectively a speed reduction and a one-to-one drive in the same direction between the two cross shafts in place of the one-to-one reverse drive secured by the gears shown in Fig. 1. The same reference numerals are applied to corresponding parts throughout the views.

The transmission mechanism of the present invention, while capable of application to a variety of machine tools wherever it is desired to communicate different speeds forward and reverse to an operating part, is herein illustrated as applied to a heavy duty boring and drilling machine which also has the capacity for performing other operations such as tapping, or facing off shoulders and bosses. By certain minor variations in design and construction it would also be possible to apply the transmission mechanism of the present invention to still further uses outside of machine tools. It will, therefore, be understood that the following description is not intended to place any limitation on the present invention so far as the application thereof is concerned.

The machine illustrated comprises a base 10 with an adjoining column 11 on which the head 12 is carried. The head is reciprocable on ways 13 for operation over the table 14 on which the fixture carrying the work to be operated upon is secured. In the present case, the head 12 is operated by a rod 15 bearing a piston received in a hydraulic cylinder 16. The oil or other motive fluid is supplied to the cylinder 16 by a pump 17 operated by a motor 18 and mounted with the latter on a base 19 alongside the column 11. The speed of travel of the head is determined in the usual manner by regulating the delivery of the pump. The lever 20 is provided for this purpose and is arranged to turn the bevel gear 21 which serves to rotate an eccentrically mounted cylinder block in the pump 17 so that its position with respect to the crank element on which the pistons are mounted may be adjusted to different degrees of eccentricity and the delivery of the pump is correspondingly varied. This type of pump is well known and requires no further description. The lever 22, carried by the stand 11, and the dogs 23, adjustably mounted in the T slots 24 on the sides of the head 12, are provided to determine the length of the stroke of the head in the usual manner. This much description of one type of machine with which the transmission mechanism of my invention may be used will suffice for the present purposes. I will, therefore, proceed with a detailed description of my improved transmission mechanism by means of which the desired range of drives may be afforded for the spindles mounted in the chucks 25 and driven by the motor 26. In the present case, three chucks are shown for as many spindles. The number and disposition of these chucks is, of course, determined by the requirements of the particular job to be handled.

The head 12 comprises a housing 27 open at the opposite ends thereof to provide places for mounting the spindle face plate 28 and the housing 29 of the electric motor 26. The transmission mechanism is enclosed in the housing 27 in an oil chamber 30 provided therein intermediate the ends. The drive shaft 31 of the transmission mechanism is hollow so as to receive the end of the armature shaft 32 of the motor 26. A key 33 provides for a detachable driving connection between the armature shaft 32 and the drive shaft 31 of the transmission. The shaft 31 is connected with the driven shaft 34 through intermediate transmission to be presently described. A cross slot 35 provided in the headed end 36 of the driven shaft 34 is arranged to receive a tongue provided on the central drive element 37 of a gear cluster associated with the chucks 25 and contained within a housing 38 on the face plate 28. It will thus appear that the head 12 is self-contained and is independent of any intermediate gearing, spline shafts and the like which would have to be provided if the spindle drive were extended from the base to the head as is quite commonly the case in machines of the present type. The present machine, by virtue of the self-contained construction of the head, operates with less noise and much less power consumption and, furthermore, involves less cost in production and maintenance. The transmission mechanism, a description of which immediately follows, serves to communicate the desired range of drives to the spindles and provides either a single speed, two different speeds, or one speed forward and the same speed or a different speed in reverse.

The transmission mechanism comprises two parallel cross shafts 39 and 40 arranged transversely with respect to the shafts 31 and 34 and suitably received in bearings in the side walls of the chamber 30 of the housing 27. The shaft 39 has a worm gear 41 fixed thereon intermediate the ends thereof and arranged in meshing engagement with a worm 42 provided as an integral part of the drive shaft 31. The drive shaft 31 has, therefore, a step-down driving connection with the cross shaft 39 so that the latter operates at a reduced speed. This is, of course, of advantage from the standpoint that the shaft 39 is arranged to be connected in driving relation with hubs 43 and 44 through friction disk clutches 45 and 46. The hubs 43 and 44 are received in anti-friction bearings 47 mounted in bushings 48 fitting in openings 49 in the side walls of the chamber 30. The ends of the shaft 39 bear within the hubs 43 and 44 in bushings 50 provided in the hubs. Either one of the hubs may be clutched to turn with the shaft 39 by engagement of either one of the clutches 45 and 46. The clutches are operated by collars 51 and 52 slidably mounted on the shaft 39. Tapered annular faces 53 are provided on the clutch collars to operate pawls 54 mounted in notches 55 on rings 56. The pawls 54 when engaged by the tapered faces of the clutch collars are arranged to bear against the pressure plates 57 of the disk clutches to throw the clutches in and place the shaft 39 in driving relation with either one of the hubs, depending on which clutch has been engaged. The yokes 58 and 59, associated with the collars 51 and 52, are mounted on the ends of levers 60 pivoted on bosses 61 depending from the cover plate 62. A cross link 63 interconnects the levers 60 for movement together and is arranged to be moved back and forth by the rocking of a lever 64 with a hand lever 65 extending along the top of the head, as shown in Fig. 3. The arrangement is such that, when the lever 65 is in mid position, neither clutch is engaged and the shaft 39 turns freely within both of the hubs 43 and 44 but when the lever 65 is swung to one side or the other from its central position either one of the clutches will be operated, the movement of the handle to the right or left serving to engage the clutch on the right or left hand side of the head. It is possible to have only one clutch engaged at any time. When, for example, the clutch 45 is engaged, the hub 43 is driven with the shaft 39. The drive is transmitted to the cross shaft 40 through pick-off gears 66 and 67, the former of which is removably mounted on the hub 43 while the latter is removably mounted on one end of the shaft 40. The shaft 40 has a reduction drive connection with the driven shaft 34 by means of a worm 68, provided preferably as an integral part of the shaft 40, meshing with a worm gear 69 keyed on the inner end of the driven shaft. The speed of the driven shaft 34 in relation to the speed of the drive shaft 31 will obviously depend on the ratio of the particular pick-off gears employed. These gears may be in a one-to-one ratio, as shown in Fig. 1, or may, as shown by the gears 66' and 67' in Fig. 6, be in a different ratio to secure a reduction in speed between the shafts 39 and 40, or an intermediate idler gear may be employed, as shown at 70 in Fig. 7, between the pick-off gears 66" and 67" to drive the cross shaft 40 in the same direction as the shaft 39. When the shaft 40 is driven in the same direction with the shaft 39 the driven shaft 34 will obviously be turned in the opposite direction from that secured when the shafts 39 and 40 turn in opposite directions as in Fig. 1. The ratio of the gears 66" and 67" will, of course, determine whether the shaft 40 will be driven at the same speed as the shaft 39 or at a different speed. In some machines, a single set of gears may be provided between the cross shafts 39 and 40 between which the range of drives may be afforded by pick-off gears in the manner just described. However, I prefer to provide two sets of gears at the opposite ends of the cross shafts and have illustrated in Figs. 4 and 5 a second pair of mated gears 71 and 72, the former of which is removably mounted on the hub 44 while the latter is removably fixed to the end of the shaft 40. With this arrangement, it is obviously possible to secure the same speed or two different speeds between the two sets of gears or one speed forward may be provided by one set of gears and the same or a different speed in reverse may be provided by the other set of gears, and it is obviously a simple matter to secure variations in speeds in the two sets of gears by proper selection of the gear ratios. The pick-off gears operate in depressions 73 provided in the side walls of the housing 27 which are closed by removable plates 74 so that access may be had to the gears at any time to change the same to suit the requirements of the particular job in hand.

It is believed that the foregoing description conveys a sufficiently clear understanding of the invention and of its purposes and advantages so that anyone skilled in the art to which the invention relates will readily appreciate all of its possible applications. While the invention has been described in connection with one particular embodiment, it should be understood, as stated before, that the same is capable of considerable modification and adaptation within the spirit and scope of the invention as defined by the appended claims, in which—

I claim:

1. In a transmission mechanism of the character described, the combination of a housing, a drive shaft projecting into one end of said housing, a driven shaft projecting from the other end of said housing in substantially parallel relation to the drive shaft, a pair of substantially parallel cross shafts extending transversely with respect to the drive and driven shafts and bearing at opposite ends in the side walls of said housing, gears provided for the two ends of said shafts to provide a driving connection between said shafts at both ends, said gears being pick-off gears to permit the gear ratios at the two driving connections to be changed as desired to provide either a single speed or two different speeds by the gears at the two ends of said shafts, an idler shaft arranged to be disposed between said cross shafts at one end thereof to carry an idler gear to mesh between the gears on the ends of the cross shafts whereby to enable securing one speed in one direction with the gears at one end of said cross shafts and the same or a different speed in reverse with the gears at the other end of said cross shafts, said housing having recesses adjacent the ends of said cross shafts to receive the mated gears, removable closures for said recesses affording access to said gears whereby the same may be changed, driving connections between the cross shafts and the drive and driven shafts, and clutching means for throwing either set of cross shaft gears into action to complete the drive from the drive shaft to the driven shaft.

2. In a transmission mechanism as set forth in claim 1, the provision in connection with one of the cross shafts of the clutching means comprising two separate clutches for the gears at the opposite ends of said cross shaft, to place the same selectively in driving relation with the cross shaft and hence with the drive shaft, and clutch shifting means between said clutches and arranged for manual operation from without the housing to throw either set of gears into or out of action as desired.

3. In a transmission mechanism of the character described, the combination of a housing, a drive shaft projecting into said housing, a driven shaft projecting from the housing and in substantially parallel relation to the drive shaft, a pair of substantially parallel cross shafts arranged transversely with respect to the drive and driven shafts, one of said cross shafts having a driving connection intermediate its ends with the driven shaft, gears removably mounted on the ends of said cross shaft, either one of which is arranged to transmit power through the cross shaft to the driven shaft, a pair of hub elements bearing freely in the housing and providing bearings therein to receive the ends of the remaining cross shaft, means for clutching either of said hub elements with the cross shaft, and gears removably mounted on said hub elements and in driving relation with the gears on the first mentioned cross shaft, the removable mated gears of the cross shafts being arranged to be changed as desired to secure either a single speed or two different speeds in one direction by gears at the two ends of the shafts, and an idler shaft arranged to be disposed between the cross shafts at one end thereof to carry an idler gear meshing between the mated gears whereby to secure one speed forward and the same or a different speed in reverse.

4. In a spindle drive transmission mechanism, the combination with a housing serving as a spindle carriage and having the opposite ends thereof providing places for mounting the face plate with the spindles therein at one end of said housing and the housing of a driving motor at the other end, of a drive shaft received in bearings in said housing and arranged to have a detachable driving connection with the armature shaft of the motor mounted on said housing, a driven shaft received in bearings in said housing and arranged to have a detachable driving connection with the central drive element of the spindles in the spindle face plate, transmission gearing in said housing between the driving and driven shafts, said gearing including clutching means for throwing the same into and out of action, and a manually shiftable clutch lever operable from without the housing for operating the clutching means.

5. In a machine of the character described, the combination with a support, of a self-contained spindle head comprising a housing reciprocably mounted on said support to serve as a carriage, said housing providing places at the opposite ends thereof for mounting a face plate to carry a spindle or spindles at one end of said housing and for mounting the housing of a driving motor at the other end of said housing, the face plate having a central drive element extending therefrom into the housing, a driven shaft in said housing arranged to have detachable driving connection with said element, said motor having the armature shaft thereof extending into the other end of said housing, a drive shaft in said housing arranged to have detachable driving connection with said armature shaft, and intermediate transmission means within said housing between the drive shaft and driven shaft.

6. In a spindle drive transmission mechanism, the combination with a housing serving as a spindle carriage and having the opposite ends thereof providing places for mounting the face plate with the spindles therein at one end of said housing and the housing of a driving motor at the other end, of a drive shaft received in bearings in said housing and arranged to have a detachable driving connection with the armature shaft of the motor mounted on said housing, a driven shaft received in bearings in said housing and arranged to have a detachable driving connection with the central drive element of the spindles in the spindle face plate, a pair of transverse cross shafts arranged in substantially parallel relationship and bearing at the ends thereof in the side walls of said housing, the drive shaft having a reduction driving connection with one of said cross shafts, the other cross shaft having a reduction driving connection with the driven shaft, pick-off gears at opposite ends of said cross shafts providing driving connections between the cross shafts, the gears at one end of said shafts providing a different drive from those at the other end, clutching means to place either set of gears into driving relation with one of the cross shafts, a manually shiftable clutch lever operable from without the housing for selectively engaging either of the clutching means, said housing having recesses in the sides thereof about the ends of the cross shafts to receive the cross shaft gears, and removable closures for said recesses to afford access to said gears whereby the same may be changed as desired.

7. In a transmission mechanism, the combination of a housing, driving and driven shafts projecting into and out of said housing, a pair of cross shafts extending transversely with respect to the driving and driven shafts and bearing at opposite ends in opposed walls of said housing, said housing walls having recesses adjacent the ends of said cross shafts, at least one of the cross shafts having the ends thereof projecting into the recesses, pick-off gears mounted removably on the ends of said cross shafts to provide variable driving connections between said shafts at both ends, removable closures for said recesses affording access to to said gears whereby the same may be changed, driving connections between the cross shafts and the driving and driven shafts, and clutching means for throwing either set of cross shaft gears into action to complete the drive from the driving shaft to the driven shaft, one of the mated gears of a pair in one of said recesses being mounted directly on the end of the projecting cross shaft, and a hub element bearing in the housing wall and having the end of the other cross shaft bearing therein, the said hub element projecting into said recess and having the other gear of the pair mounted thereon, said hub element being arranged to be clutched selectively to the cross shaft which bears therein.

8. In a transmission mechanism, the combination of a housing, driving and driven shafts extending into and out of said housing, a pair of substantially parallel cross shafts extending transversely with respect to the driving and driven shafts and bearing at opposite ends in opposed walls of said housing, gears mounted on the ends of said shafts to provide a driving connection therebetween, the said gears being removably mounted on said shafts as pick-off gears whereby to permit changing the gear ratios as desired, the said gears being removable from said shafts from without the housing, driving connections between the cross shafts and the driving and driven shafts intermediate the ends of said cross shafts, and clutching means for throwing either set of said gears into action to complete the drive from the driving shaft to the driven shaft, only one gear of each pair being mounted directly on a shaft, a hub element at each end of the other cross shaft bearing in the housing wall and having the ends of the other cross shaft received therein for bearing, the other gear of the pair being mounted on the projecting end of said hub element, and the said hub element being arranged to be clutched to the shaft which bears therein.

9. In a transmission mechanism the combination of a housing, a driving and a driven shaft, a pair of substantially parallel cross shafts extending in transverse relation thereto having adjoining ends bearings in a wall of said housing, driving connections between the cross shafts and the driving and driven shafts, gears provided for the adjoining ends of said cross shafts arranged to provide a driving connection therebetween, the one gear of the pair being mounted directly on one of said cross shafts, a hub element on the end of the other cross shaft having the other gear of the pair mounted thereon, the said gears being changeable from without the housing whereby to provide a different ratio gearing connection between the cross shafts, and means providing a detachable driving connection between the hub element and its cross shaft.

10. In a transmission mechanism the combination of a housing, a driving and a driven shaft, a pair of substantially parallel cross shafts extending in transverse relation thereto having adjoining ends bearing in a wall of said housing, the said wall having a recess provided therein about the ends of said cross shafts, gears for the adjoining ends of said cross shafts arranged to provide a driving connection therebetween, the one of said gears being removably mounted directly on the end of one of said shafts, a hub element mounted on the end of the other shaft and having the other gear of the pair removably mounted thereon, the said gears being changeable from without the housing whereby to provide a different ratio gearing connection between the cross shafts, a removable closure for said recess affording access to said gears to permit changing the same from without the housing, and means within the housing manually operable from without the housing providing a detachable driving connection between the hub element and its cross shaft.

11. A device of the character described, comprising the combination with a support, of a self-contained spindle head comprising a housing mounted on said support and providing places at the opposite ends thereof for mounting a face plate to carry a spindle or spindles at one end of said housing and for mounting the housing of a driving motor at the other end of said housing, the face plate having the drive element therefor extending into the housing, a driven shaft in said housing arranged to have detachable driving connection with said element, said motor having the armature shaft thereof extending into the other end of said housing, a drive shaft in said housing arranged to have detachable driving connection with said armature shaft, and intermediate transmission means within said housing between the drive shaft and driven shaft including changeable pick-off gears accessible from without the housing in the wall of said housing intermediate the ends thereof.

12. In a machine of the character described, the combination with a support, of a self-contained spindle head comprising a housing providing places at the opposite ends thereof for mounting a face plate to carry a spindle or spindles at one end of said housing and for mounting the housing of a driving motor at the other end of said housing, the face plate having a drive element extending therefrom into the housing, a driven shaft in said housing arranged to have driving connection with said element, said motor having the armature shaft thereof extending into the other end of said housing, a drive shaft in said housing arranged to have driving connection with said armature shaft, and intermediate transmission means within said housing between the drive shaft and driven shaft.

13. A device of the character described, comprising in combination with a support, of a self-contained spindle head comprising a housing mounted on said support and providing places at the opposite ends thereof for mounting a face plate to carry a spindle or spindles at one end of said housing and for mounting the housing of a driving motor at the other end of said housing, the face plate having the drive element therefor extending into the housing, a driven shaft in said housing arranged to have detachable driving connection with said element, said motor having the armature shaft thereof extending into the other end of said housing, a drive shaft in said housing arranged to have detachable driving connection with said armature shaft, and intermediate transmission means within said housing between the drive shaft and driven shaft including changeable pick-off gears accessible from without the housing in the wall of said housing intermediate the ends thereof, and also including clutching means for throwing the transmission into and out of action, and a manually shiftable clutch lever operable from without the housing for operating the clutching means.

14. In a machine of the character described, the combination with a support, of a self-contained spindle head comprising a housing providing places at the opposite ends thereof for mounting a face plate to carry a spindle or spindles at one end of said housing and for mounting the housing of a driving motor at the other end of said housing, the face plate having a drive element extending therefrom into the housing, a driven shaft in said housing arranged to have driving connection with said element, said motor having the armature shaft thereof extending into the other end of said housing, a drive shaft in said housing arranged to have driving connection with said armature shaft, and intermediate transmission means within said housing between the drive shaft and driven shaft, including changeable pick-off gears accessible from without the housing in the wall of said housing intermediate the ends thereof.

15. In a machine of the character described, the combination with a support, of a self-contained spindle head comprising a housing providing places at the opposite ends thereof for mounting a face plate to carry a spindle or spindles at one end of said housing and for mounting the housing of a driving motor at the other end of said housing, the face plate having a drive element extending therefrom into the housing, a driven shaft in said housing arranged to have driving connection with said element, said motor having the armature shaft thereof extending into the other end of said housing, a drive shaft in said housing arranged to have driving connection with said armature shaft, and intermediate transmission means within said housing between the drive shaft and driven shaft, including changeable pick-off gears accessible from without the housing in the wall of said housing intermediate the ends thereof, and also including clutching means for throwing the transmission into and out of action and a manually shiftable clutch lever operable from without the housing for operating the clutching means.

16. In a spindle drive transmission mechanism, the combination with a housing serving as a spindle carriage and having the opposite ends thereof providing places for mounting the face plate with the spindles therein at one end of said housing and the housing of a driving motor at the other end, of a drive shaft received in bearings in said housing and arranged to have a driving connection with the armature shaft of the motor mounted on said housing, a driven shaft received in bearings in said housing and arranged to have a driving connection with the drive element of the spindles in the spindle face plate, a pair of transverse cross shafts arranged in substantially parallel relationship and bearing at the ends thereof in the side walls of said housing, the drive shaft having a reduction driving connection with one of said cross shafts, the other cross shaft having a reduction driving connection with the driven shaft, pick-off gears at opposite ends of said cross shafts providing driving connections between the cross shafts, the gears at one end of said shafts providing a different drive from those at the other end, clutching means to place either set of gears into driving relation with one of the cross shafts, and a manually shiftable clutch lever operable from without the housing for selectively engaging either of the clutching means.

In witness of the foregoing I affix my signature.

JAMES J. MORRIS.